S. GUDGEON.
PLANT SUPPORTER.
APPLICATION FILED DEC. 28, 1911.
1,073,114.
Patented Sept. 16, 1913.
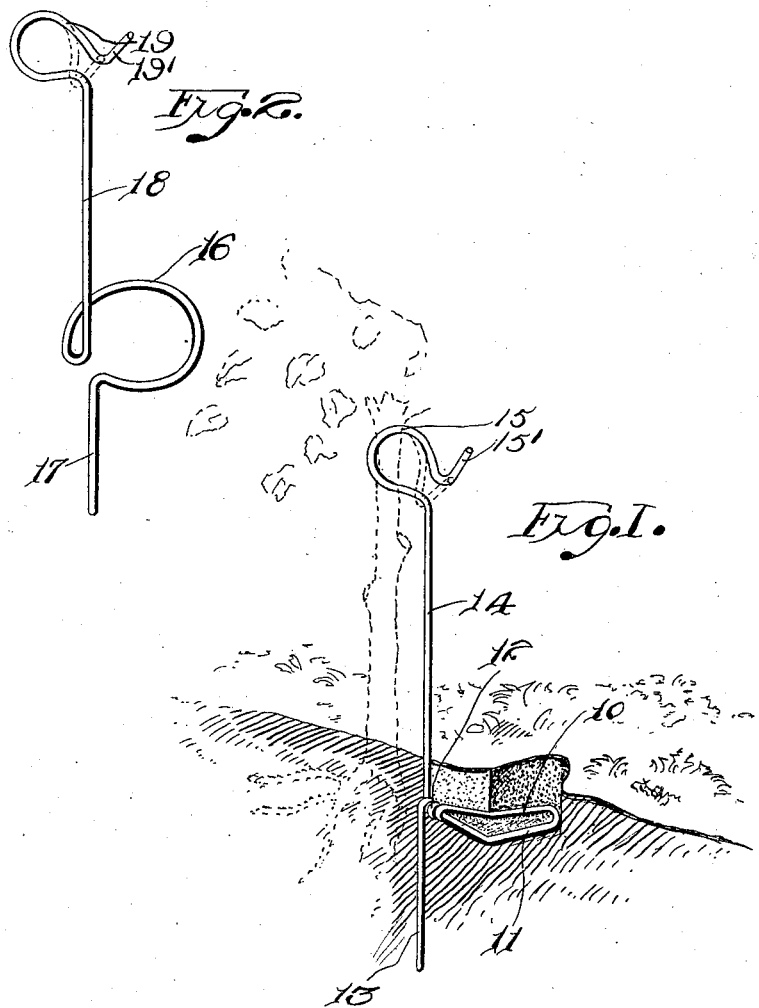
Simon Gudgeon.
INVENTOR

UNITED STATES PATENT OFFICE.

SIMON GUDGEON, OF NEW BEDFORD, MASSACHUSETTS.

PLANT-SUPPORTER.

1,073,114. Specification of Letters Patent. Patented Sept. 16, 1913.

Application filed December 28, 1911. Serial No. 668,238.

*To all whom it may concern:*

Be it known that I, SIMON GUDGEON, a citizen of the United States, residing at New Bedford, in the county of Bristol and State of Massachusetts, have invented certain new and useful Improvements in Plant-Supporters, of which the following is a specification, reference being had therein to the accompanying drawing.

This invention relates to supporters which are used to hold plants erect, so that they will not fall over of their own weight or be beaten down by heavy wind or rain.

This invention may be either formed from wire as shown in Figures 1 and 2 or may be formed from sheet metal as shown in Figs. 3 and 4.

This invention is illustrated in the accompanying drawings, wherein:

Fig. 1 is a perspective view of a wire supporter constructed in accordance with this invention. Fig. 2 is a perspective view of a modified form of supporter formed from wire.

Referring to Fig. 1 in the accompanying drawings, it will be seen that this invention may be formed from wire which is bent to form an upper portion which engages the plant, the lower portion which enters the ground, and an intermediate portion which braces the supporter so that it will be less liable to work loose. In Fig. 1, the strip of wire is bent intermediate its length to form the U-shaped bracing member having arms 10 and 11, the arms being bent as shown and the arm 10 twisted about the arm 11 as shown at 12. The end portions of the wire are bent in opposite directions to form the lower penetrating portion 13, and the upper portion 14 which has its end portion bent to form the plant engaging hook 15. The supporter is embedded as shown in Fig. 1 with the bracing member beneath the surface of the ground, and with the hook engaging the plant indicated by the dotted lines. The angularly disposed end 15′ of the hook is caught as indicated by the dotted lines to hold the plant in the hook thus doing away with the need of string.

As indicated in Fig. 2 the brace 16 may form the major portion of a circle and have the lower arm 17 and upper arm 18 extending therefrom, without the wire being twisted together. The end of the arm 18 is bent to form the hook 19 which engages the plant, and is provided with an angularly disposed end 19′ which holds the plant in the hook in the same manner as the end 15′ of the hook 15. This device is operated in the same manner as the device shown in Fig. 1.

From the above description, it will be seen that there is provided a supporter which may be very cheaply manufactured and which will securely hold the plant so that it cannot be very readily broken or bent by rain or heavy wind, since the hook engages the plant near the upper end of the stem, thus securely bracing it.

What is claimed is:—

1. A plant supporter formed from a single length of material bent intermediate its length to form a substantially U-shaped bracing member extending in a vertical plane, the arms of said bracing member being bent intermediate their length whereby the outer end portion of said bracing member will extend at substantially right angles to the inner end portion, the arms being twisted together at the inner end of said bracing member and the end portions of said arms being bent vertically in opposite directions, and the end portion of the upper arm being bent to form an engaging device, said plant supporter being adapted to be embedded in the ground to such a point that the bracing member will be positioned beneath the surface of the ground.

2. A bracing member comprising a standard adapted to be partially embedded in the ground, a bracing arm extending from said standard in the same plane as said standard and having its outer end portion bent at substantially right angles to its inner end portion, whereby said standard will be braced against strain in all directions, and engaging means at the upper end of said standard, said standard being adapted to be embedded in the ground a sufficient distance to cause said bracing means to be embedded in the ground.

In testimony whereof I hereunto affix my signature in presence of two witnesses.

SIMON GUDGEON.

Witnesses:
JOSEPH GUDGEON,
ARNOLD TAYLOR.

---

Copies of this patent may be obtained for five cents each, by addressing the "Commissioner of Patents, Washington, D. C."